No. 842,160. PATENTED JAN. 29, 1907.
B. AIKMAN.
PNEUMATIC VALVE MECHANISM.
APPLICATION FILED OCT. 21, 1905.
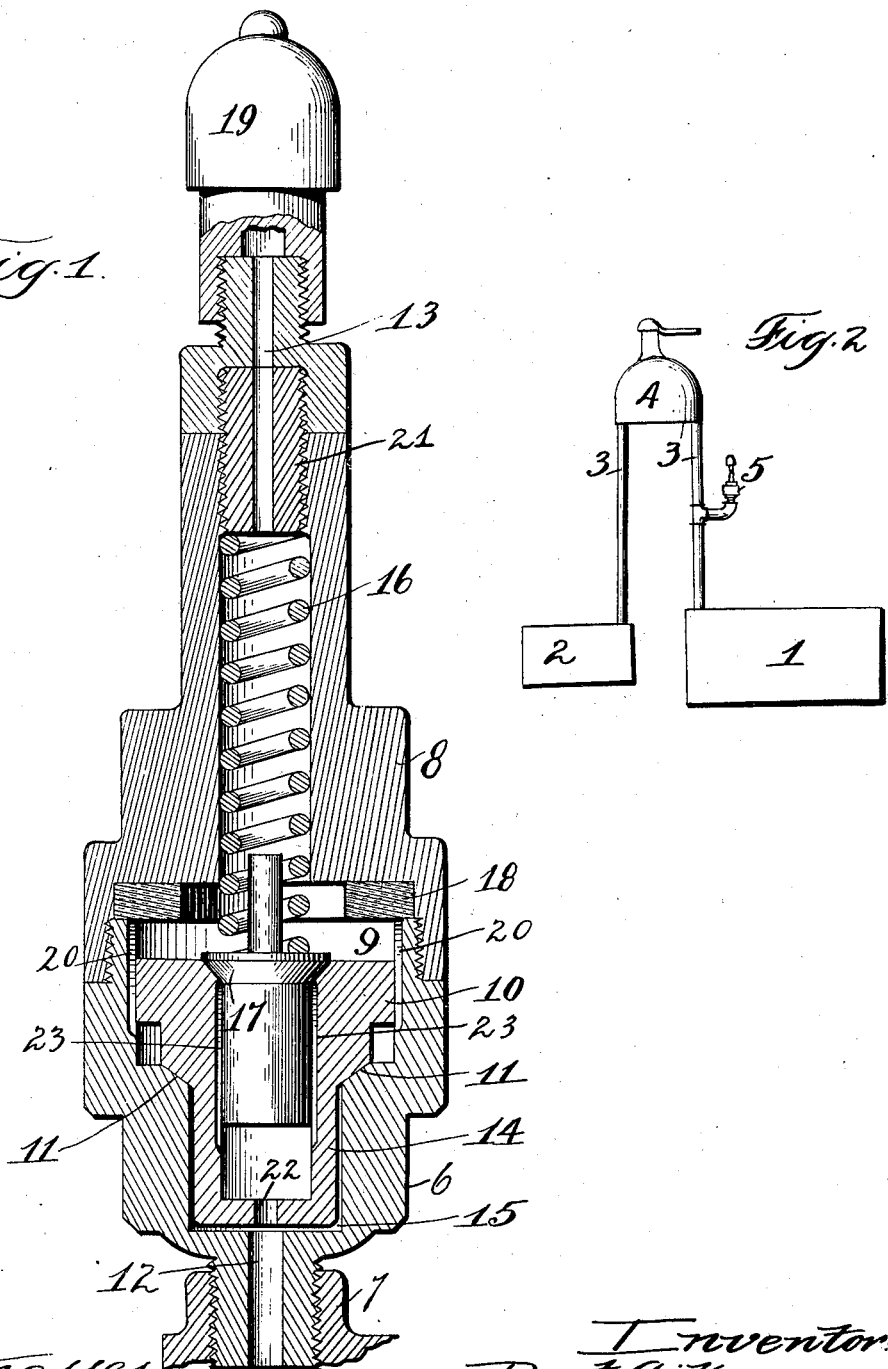
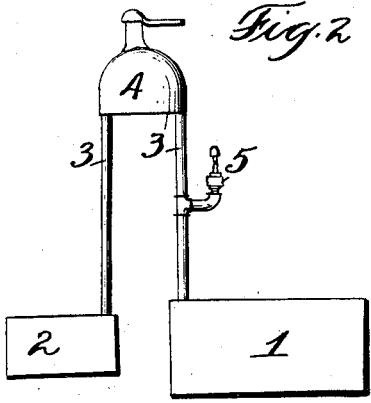
Witnesses:
Leon Stroh
John S Hamlin
Inventor:
Bert Aikman
By G. L. Cragg
Attorney

UNITED STATES PATENT OFFICE.

BERT AIKMAN, OF CHICAGO, ILLINOIS, ASSIGNOR OF ONE-HALF TO JOHN S. HAMLIN, OF CHICAGO, ILLINOIS.

PNEUMATIC-VALVE MECHANISM.

No. 842,160. Specification of Letters Patent. Patented Jan. 29, 1907.

Application filed October 21, 1905. Serial No. 283,834.

*To all whom it may concern:*

Be it known that I, BERT AIKMAN, a citizen of the United States, residing at Chicago, in the county of Cook and State of Illinois, have invented a certain new and useful Improvement in Pneumatic-Valve Mechanism, of which the following is a full, clear, concise and exact description, reference being had to the accompanying drawings, forming a part of this specification.

My invention relates to safety attachments for reservoirs containing air under pressure, and is of particular service in connection with air-brake systems, though the invention is not to be restricted to this utility.

A source of very frequent accidents in railway practice resides in the reduction of the pressure of the air below the point required for the effective operation of the air-brakes; and it is the object of my invention to provide a valve which will permit of the escape of some of the air from the tank when the pressure is reduced below a predetermined minimum, which air in escaping will operate a guarding device, such as a signal-whistle. For this purpose I provide a valve structure which is adapted when the pressure of the air exceeds a given predetermined minimum to prevent the air from escaping at the valve, but when the pressure of the air is lower than this minimum a limited portion of the air within the reservoir may escape. This air in escaping may be employed in any suitable way for the purpose stated. I desirably cause this air to operate a signal-whistle, so that the engineer or other attendant may at once start the pump to restore sufficient pressure within the reservoir.

While I prefer to operate a signal, I do not wish to be limited to the particular function that is performed by the air in escaping. In the preferred embodiment of my invention I also include a supplemental device that permits a portion of the air to escape when the pressure has exceeded a given maximum, and this escaping air may likewise effect an audible signal, so that the engineer may stop the pump. It will be seen that in this way effective pressure of the air within the reservoir may be constantly maintained, so that if the air is used in the operation of air-brakes, for example, said brakes need never fail in their operation because of insufficient air-pressure.

I will explain my invention more particularly by describing the preferred embodiment thereof shown in the drawings, in which—

Figure 1 is a view of a valve structure, and Fig. 2 is a diagrammatic view illustrating the application of the invention to an air-brake system.

Referring first to Fig. 2, I have shown an air-reservoir 1, which may, for example, be located on the bottom of an electric car and which is connected with the brake-cylinder 2 by way of the piping 3 and the motorman's controlling-valve 4. The valve 5 of my invention communicates with the piping 3 between the elements 1 4.

The base 6 of the valve structure is screwed into the fitting 7, and the cap 8 is screw-threaded upon the base 6. A chamber 9 is afforded between the base 6 and cap 8, in which a piston or slide 10 is adapted to reciprocate, said piston being seated at 11 upon the base-section to seal the passage 12, that is adapted to communicate with the chamber 9 and to cut off communication between this passage 12 and the passage 13, that extends to the external air, the passage 12 being in communication with the air-reservoir to make the piston mechanism subject to the air-pressure. The stem 14 of the piston is of smaller diameter than the piston itself and is normally received within the reduction 15 of the chamber 9. Some suitable element, as a coiled spring 16, rests upon the piston normally to seat the same at the seat or port 11. The spring 16 engages the valve 10, in this instance being directly engaged with the supplemental valve 17, whose function will be later set forth, this valve 17 being always seated unless the pressure of the air through the passage 12 is excessive.

As I am now describing that portion of my invention that guards against the reduction of the pressure within the air-reservoir below a predetermined minimum, I will consider in this portion of the description that the parts 10 17 are fixed as they normally are, their separation being only effected when the air-pressure in the tank is excessive. When the air exceeds a given minimum pressure, the piston 10 has its upper face in contact with the packing-ring 18, constituting a seat or port, that may be of leather, if desired, or said piston may otherwise be made effective to prevent air from escaping through the passages 12 13, the spring 16 being adjusted to permit the engagement of the elements 10 18 while said pressure exceeds said minimum value, the spring, (which is the preferred instrumentality for this function,) whoever, exerting sufficient pressure to remove the piston 10 from its seat 18 when the air-pressure is reduced below the lower predetermined limit, whereupon air will escape from the passage 12 through the bore containing the spring 16, the passage 13, and thence to perform its service, this service being in the instance shown the operation of the whistle 19. For the purpose of enabling the air to pass as last described channels 20 may, if desired, be provided in the base-section 6, through which the air will pass into the passage containing the spring 16 as soon as the piston 10 is removed from its seat 18; but I do not wish to be limited to this way of affording space between the piston and the wall of the piston-chamber. The descent of the piston 10 is sufficiently slow to give the air in escaping through the passage 13 requisite opportunity to perform its function. After the piston has seated itself at 11 the pump may be operated to increase the pressure within the tank, as 1, and said piston will not be removed from its seat until the predetermined maximum pressure has been reached, for now the area of the valve structure subject to the air under pressure is limited to the stem 14, which area is therefore considerably less than when the piston 10 is removed from its seat 11. As soon, however, as a maximum or a predetermined higher pressure is reached the return of the piston 10 upon its seat 18 will be very quick, particularly as compared with the descent of the piston toward its seat 11 under the conditions specified, as a consequence of which rapid return movement of the piston 10 there is no material waste of the air under high pressure. The spring 16 may be adjusted by the screw-plug 21 to regulate the force exerted by the spring upon the piston 10. Obviously the closer the coils of the spring the greater will be the value of the minimum pressure and the maximum pressure also. If the pump continues its operation after the piston 10 has been restored to its seat 18, it is desirable to guard against an excessive pressure in addition to that required to seat the piston 10 at 18, to which end I employ the supplemental high-pressure valve 17, normally resting in a seat afforded in the piston 10 and working within a bore in said piston, the bore in said piston having communication at 22 with the spaces 12 15, so that the piston or valve 17 will be subject to the pressure of the air passing through the passage 12. When the pressure of the air is excessive, the piston 17 will be raised against the force of the spring 16, whereupon the air will find passage between the piston 17 and its normal seat, this air in the structure shown sounding the whistle at 19 as this air finds passage through the bore containing the spring 16 and the duct 13. In order that this air may find this passage, I provide some suitable passage-way, as the grooves 23.

While I have herein shown and particularly described the preferred embodiment of my invention, I do not wish to be limited to the precise structure shown, as modifications may readily be made therein without departing from the spirit of the invention; but,

Having thus described my invention, I claim as new and desire to secure by Letters Patent—

1. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, mechanical means tending to press the slide toward the latter seat and operating substantially throughout the extent of travel of the slide, and a guarding device operated by the air that is permitted to escape by the slide when passing from the larger to the smaller seat.

2. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, a spring tending to press the slide toward the latter seat and operating substantially throughout the extent of travel of the slide, and a guarding device operated by the air that is permitted to escape by the slide when passing from the larger to the smaller seat.

3. A structure of the class described including in its formation a slide, a casing within which the slide travels and through which passage of air is prevented or permitted by said slide, two seats or ports of different sizes longitudinally engaged by the slide, said slide presenting a comparatively large area to the air-pressure, when in engagement with one seat, and a smaller area, when in engagement with the other seat, mechanical means tending to press the slide toward the latter seat and operating substantially throughout the extent of travel of the slide, regulating means for adjusting the action of said means, and a guarding device operated by the air that is permitted to escape by the slide when passing from the larger to the smaller seat.

4. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, a spring tending to press the slide toward the latter seat and operating substantially throughout the extent of travel of the slide, regulating means for adjusting the action of said spring, and a guarding device operated by the air that is permitted to escape by the slide when passing from the larger to the smaller seat.

5. A structure of the class described including in its formation a piston, a casing within which the piston travels and through which passage of air is prevented or permitted by said piston, two seats of different sizes, one at each limit of the travel of the piston, said piston presenting a comparatively large area to the air-pressure, when in engagement with one seat, and a smaller area, when in engagement with the other seat, mechanical means tending to press the piston toward the latter seat and operating substantially throughout the extent of travel of the slide, a supplemental piston or valve 17 carried by the piston and operable upon excessive pressure to permit the escape of air through said casing, and a guarding device operated by the air that is permitted to escape by the piston when passing from the larger to the smaller seat.

6. A structure of the class described including in its formation a piston, a casing within which the piston travels and through which passage of air is prevented or permitted by said piston, two seats of different sizes, one at each limit of the travel of the piston, said piston presenting a comparatively large area to the air-pressure, when in engagement with one seat, and a smaller area, when in engagement with the other seat, a spring tending to press the piston toward the latter seat and operating substantially throughout the extent of travel of the slide, a supplemental piston or valve 17 carried by the piston and operable upon excessive pressure to permit the escape of air through said casing, and a guarding device operated by the air that is permitted to escape by the piston when passing from the larger to the smaller seat.

7. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, mechanical means tending to press the slide toward the latter seat and operating substantially throughout the extent of travel of the slide, and a signal operated by the air that is permitted to escape by the slide when passing from the larger to the smaller seat.

8. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, a spring tending to press the slide toward the latter seat and operating substantially throughout the extent of travel of the slide, and a signal operated by the air that is permitted to escape by the slide when passing from the larger to the smaller seat.

9. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, mechanical means tending to press the slide toward the latter seat and operating substantially throughout the extent of travel of the slide, regulating means for adjusting the action of said means, and a signal operated by the air that is permitted to escape by the slide when passing from the larger to the smaller seat.

10. A structure of the class described including in its formation a slide, a casing within which the slide travels and through which passage of air is prevented or permitted by said slide, two seats or ports of different sizes alternately engaged by the slide, said slide presenting a comparatively large area to the air-pressure, when in engagement with one seat, and a smaller area, when in engagement with the other seat, a spring tending to press the slide toward the latter seat and operating substantially throughout the extent of travel of the slide, regulating means for adjusting the action of said spring, and a signal operated by the air that is permitted to escape by the slide when passing from the larger to the smaller seat.

11. A structure of the class described including in its formation a piston, a casing within which the piston travels and through which passage of air is prevented or permitted by said piston, two seats of different sizes, one at each limit of the travel of the piston, said piston presenting a comparatively large area to the air-pressure, when in engagement with one seat, and a smaller area, when in engagement with the other seat, mechanical means tending to press the piston toward the latter seat and operating substantially throughout the extent of travel of the slide, a supplemental piston or valve 17 carried by the piston and operable upon excessive pressure to permit the escape of air through said casing, a signal operated by the air that is permitted to escape by the slide when passing from the larger to the smaller seat, and a guarding device operated by the air that is permitted to escape by the piston when passing from the larger to the smaller seat.

12. A structure of the class described including in its formation a piston, a casing within which the piston travels and through which passage of air is prevented or permitted by said piston, two seats of different sizes, one at each limit of the travel of the piston, said piston presenting a comparatively large area to the air-pressure, when in engagement with one seat, and a smaller area, when in engagement with the other seat, a spring tending to press the piston toward the latter seat and operating substantially throughout the extent of travel of the slide, a supplemental piston or valve 17 carried by the piston and operable upon excessive pressure to permit the escape of air through said casing, a signal operated by the air that is permitted to escape by the slide when passing from the larger to the smaller seat, and a guarding device operated by the piston when passing from the larger to the smaller seat.

In witness whereof I hereunto subscribe my name this 16th day of October, A. D. 1905.

BERT AIKMAN.

Witnesses:
  G. L. CRAGG,
  JOHN S. HAMLIN.